(12) United States Patent
Petit-Jean

(10) Patent No.: US 8,934,600 B2
(45) Date of Patent: Jan. 13, 2015

(54) PRESSURISER FOR A PRESSURISED WATER NUCLEAR POWER PLANT

(75) Inventor: Sébastien Michel Marie Petit-Jean, Chatou (FR)

(73) Assignee: Areva NP, Courbevoie (FR)

( * ) Notice: Subject to any disclaimer, the term of this patent is extended or adjusted under 35 U.S.C. 154(b) by 877 days.

(21) Appl. No.: 12/531,746

(22) PCT Filed: Mar. 14, 2008

(86) PCT No.: PCT/FR2008/050441
§ 371 (c)(1),
(2), (4) Date: Oct. 5, 2009

(87) PCT Pub. No.: WO2008/135679
PCT Pub. Date: Nov. 13, 2008

(65) Prior Publication Data
US 2010/0034334 A1 Feb. 11, 2010

(30) Foreign Application Priority Data
Mar. 22, 2007 (FR) ..................................... 07 53978

(51) Int. Cl.
G21C 19/00 (2006.01)
G21C 1/09 (2006.01)
F16L 5/02 (2006.01)
F16L 41/08 (2006.01)
G21C 17/017 (2006.01)

(52) U.S. Cl.
CPC ... *G21C 1/09* (2013.01); *F16L 5/02* (2013.01); *F16L 41/086* (2013.01); *G21C 17/017* (2013.01); *G21Y 2002/401* (2013.01); *G21Y 2004/30* (2013.01); *G21Y 2004/50* (2013.01); *Y02E 30/40* (2013.01)
USPC .......................................................... 376/260

(58) Field of Classification Search
CPC ........... G21C 1/09; G21C 17/017; F16L 5/02; F16L 41/086; G21Y 2002/401; G21Y 2004/30; G21Y 2004/50; Y02E 30/40
USPC ............................................................... 376/260
See application file for complete search history.

(56) References Cited

U.S. PATENT DOCUMENTS

| 4,305,429 A * | 12/1981 | Parras .............................. 138/44 |
| 4,682,725 A * | 7/1987 | Martin et al. .................. 228/119 |
| 5,149,490 A * | 9/1992 | Brown et al. .................. 376/260 |
| 5,202,082 A * | 4/1993 | Brown et al. .................. 376/260 |
| 5,271,048 A * | 12/1993 | Behnke et al. ................. 376/260 |
| 5,605,361 A * | 2/1997 | Sims ............................. 285/206 |
| 6,195,406 B1 * | 2/2001 | Conrads et al. ............... 376/307 |
| 2011/0142188 A1 * | 6/2011 | Baek et al. ..................... 376/260 |

FOREIGN PATENT DOCUMENTS

| DE | 32 18 337 | 12/1983 |
| EP | 0 012 057 | 6/1980 |
| EP | 0 158 544 | 10/1985 |

* cited by examiner

Primary Examiner — Frank J McGue
(74) Attorney, Agent, or Firm — Fay Kaplun & Marcin, LLP

(57) ABSTRACT

A pressurizer is for a pressurized water nuclear power plant and it includes an upper cap provided with a tube; an end piece connected to the tube using a weld; and a sleeve protecting the weld, disposed inside the tube. The protective sleeve is mounted in a removable manner, such that the thermal sleeve is removed.

7 Claims, 2 Drawing Sheets

PRESSURISER FOR A PRESSURISED WATER NUCLEAR POWER PLANT

FIELD OF INVENTION

The present invention relates to a pressurizer for a pressurized water nuclear power plant.

BACKGROUND INFORMATION

A pressurizer for a pressurized water nuclear power plant is a pressure vessel that is part of the main primary system of the plant. It is composed of 3 vertical cylindrical shells and two hemispherical caps at the two ends. It is constructed in ferritic steel with a coating in austenitic stainless steel over all inner surfaces in contact with the primary fluid. The pressurizer is equipped, on its lower part, with vertical heaters and a connecting branch with an expansion line. On its upper cap, it comprises a nozzle equipped with a thermal sleeve and a spray head. The thermal sleeve allows the nozzle to be protected against excessive thermal changes, thus reducing as much as possible damage due to fatigue. The nozzle is made of ferritic steel and is covered on its inner face with a stainless steel coating. The nozzle is connected to a spray pipe via a safety end piece in austenitic stainless steel. The weld between the nozzle and the end piece is thus made in the form of a bimetallic weld while the weld between the safety end piece and the spray nozzle in austenitic stainless steel is made by using a homogeneous weld.

In general, document FR0158544 describes a thermal sleeve welded to the inside of the conduit in which it is located. Replacing this sleeve involves cutting the conduit twice before the sleeve can be removed by eliminating the weld bead of the sleeve on the conduit.

SUMMARY INVENTION

In this context, the present invention aims to provide a pressurizer for a pressurized water nuclear power plant particularly facilitating the inspection and maintenance of the bimetallic weld mentioned above as well as the stainless steel coating of the nozzle.

For this purpose, the invention proposes a pressurizer for a pressurized water nuclear power plant comprising:
- an upper cap equipped with a nozzle,
- an end piece connected to said nozzle through a weld,
- a sleeve for protecting said weld disposed inside said nozzle, the pressurizer being characterized in that said protective sleeve is mounted removably such that the removal operation of said thermal sleeve is done from inside said pressurizer.

Thanks to the invention, removal of the protective sleeve allows the weld between the spray nozzle and the end piece to be inspected and maintained.

In addition, as the sleeve makes the inner stainless steel coating of the nozzle inaccessible, the inspection and maintenance of this coating will be considerably facilitated by removing the sleeve.

In addition, it will be noted that the sleeves used in the prior art were welded on an end piece: the replacement of one sleeve would therefore involve cutting at the level of the end piece or the spray pipe to remove the sleeve and have access to the weld. The act of making the sleeve removable thus also facilitates the replacement of this sleeve by the inside of the pressurizer without cutting the end piece or the spray pipe.

The pressurizer may also present one or more of the characteristics below, considered individually or according to all technically possible combinations:

Advantageously, the protective sleeve comprises on its external surface a plurality of regularly distributed antivibration pads.

According to a preferential embodiment, the nozzle is covered on its inner face with a coating and the pressurizer comprises a support piece fixed on said coating and presenting an internal thread, the protective sleeve being screwed on the internal thread.

In addition, the support piece presents an external thread, the pressurizer comprising a spray head screwed on the external thread.

In a particularly advantageous manner, the lower end of the protective sleeve is such that, when the sleeve is in place, said end is positioned between the support piece and the spray head.

Preferentially, the pressurizer comprises means for locking in rotation the spray head that may be fixed to the support piece through a weld.

The present invention also relates to a method for removing a thermal sleeve in a pressurizer according to the invention and comprising the following steps:
- removing the weld between the rotational locking means and the support piece,
- removing the rotational locking means,
- unscrewing the spray head,
- unscrewing the thermal sleeve.

BRIEF DESCRIPTION OF DRAWINGS

Other characteristics and advantages of the invention will emerge clearly from the description that is given below, for indicative and in no way limiting purposes, with reference to the attached figures, among which.

In all figures, common elements bear the same reference numbers.

DETAILED DESCRIPTION

Figure 1:
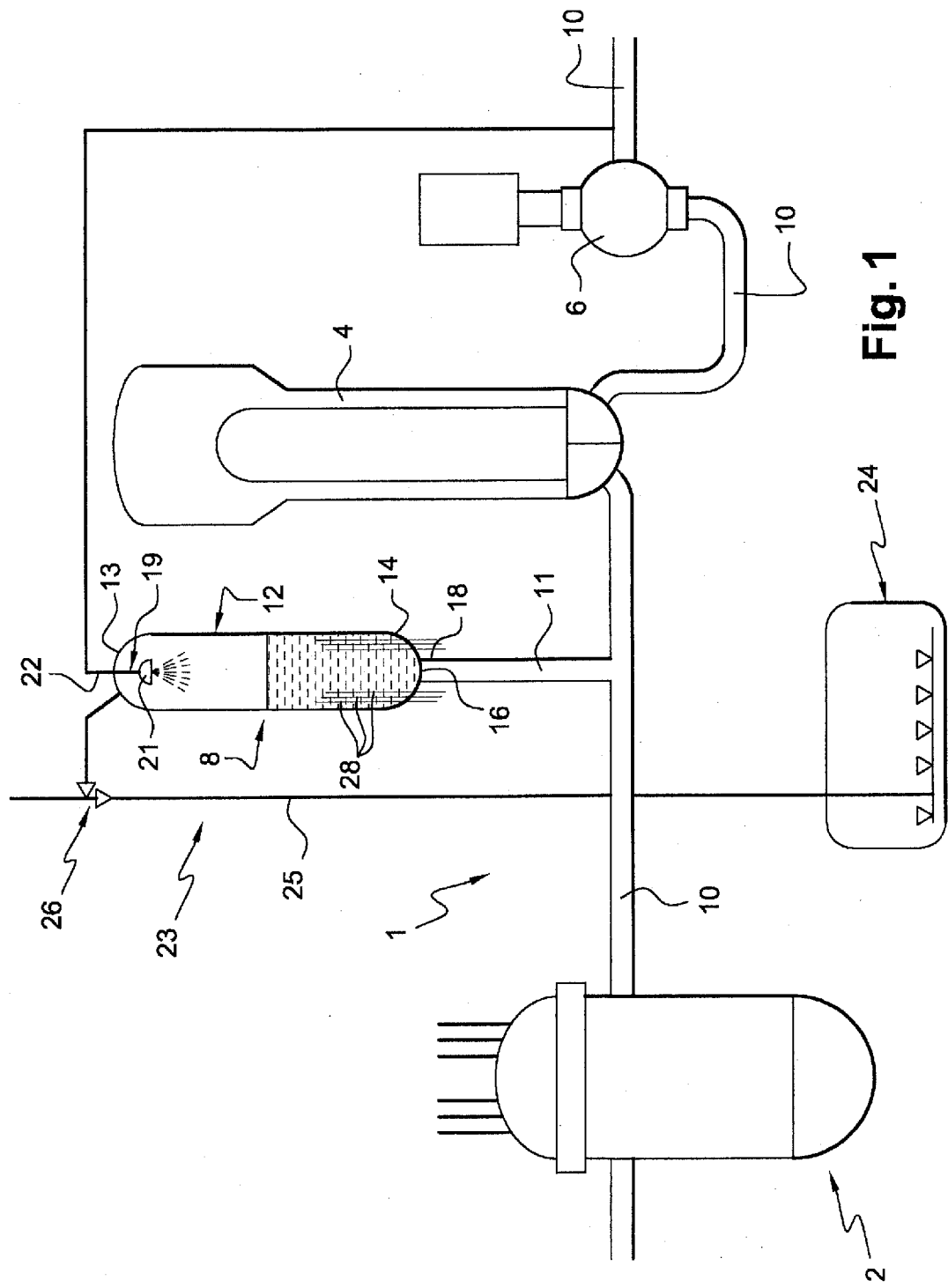
FIG. 1 is a simplified schematic representation of the primary system of a pressurized water nuclear reactor, comprising a pressurizer according to the invention.

FIG. 1 represents a primary system 1 of the pressurized water nuclear reactor comprising three or four primary loops. FIG. 1 is a simplified schematic representation and only one primary loop 10 is represented. This primary system 1 comprises a vessel 2 in which nuclear fuel assemblies, 3 or 4 steam generators 4 (one per loop) equipped with primary and secondary sides, 3 or 4 primary coolant pumps 6 (one per loop), and a pressurizer 8 are found. Each primary loop 10 allows the vessel 2, a steam generator 4 and a pump 6 to be connected. The pressurizer 8 is connected to one of the 3 or 4 primary loops 10 through an expansion line 11. For illustrative purposes, the pressurizer 8 is connected to the primary loop 10 represented in FIG. 1. This primary loop 10 contains primary water, this water being discharged by the pump 6 to the vessel 2, traverses the vessel 2 by undergoing heating in contact with fuel assemblies, then traverses the primary side of the steam generator 4 before returning to the suction of the pump 6. The primary water heated in the vessel 2 gives up its heat in the steam generator 4 to secondary water traversing the secondary side of this generator. The secondary water circulates in a closed loop in a secondary system, not shown. The water evaporates by traversing generator 4, the steam thus produced driving a steam turbine.

The pressurizer 8 is mounted in parallel on primary loop 10 by expansion line 11 stuck on the section of the primary loop 10 connecting vessel 2 to generator 4. It is disposed at an elevation higher than that of pump 6 and vessel 2. The pressurizer 8 comprises an external forged vessel 12 that is substantially cylindrical and with a vertical axis, equipped with a hemispherical cap 13 and a lower bottom 14. The lower bottom 14 comprises a central opening 16 connected to conduit 11 by a branch 18.

The pressurizer 8 also comprises a spray system 19 equipped with a spray head 21 disposed inside the vessel 12, a pipe 22 in austenitic stainless steel connecting the spray system 19 to the primary loop 10, at the level of the pump 6 discharge, and means (not shown) for selectively allowing or prohibiting circulation of primary water in pipe 22 up to spray head 21. The spray system 19 will be described in further detail with reference to FIG. 2.

Primary system 1 also comprises a safety circuit 23 comprising a relief tank 24, 3 pipes 25 (only one is represented) connecting the tank 24 to the cap 13 of the pressurizer and 3 safety valves 26 (only one is represented) interposed on pipes 25 between tank 24 and pressurizer 8.

The inner space of pressurizer 8 is in communication with primary system 1 through branch 18 and expansion line 11. Pressurizer 8 is permanently partially filled with primary water, the water level inside the pressurizer being a function of the current operating pressure of the primary system. The crown of the pressurizer 8 is filled with water vapor, at a pressure substantially equal to the pressure of water circulating in primary pipe 10 connecting generator 4.

In case of excess pressure in the pressurizer, valve 26 opens and the water vapor is evacuated to tank 24, in which it condenses.

Pressurizer 8 is equipped with several dozen electric heaters 28. These heaters are disposed vertically and are mounted on the lower bottom 14. They traverse the bottom 14 by openings provided for this purpose (in the sleeves), sealing means being inserted between the heaters and their sleeves.

The function of pressurizer 8 is to control the water pressure in the primary system. Because it communicates by expansion line 11 with the primary pipes, it plays the role of an expansion vessel. Thus, when the volume of water circulating in the primary system increases or decreases, the water level inside pressurizer 8 will rise or drop, depending on the case.

This variation in water volume may result from, for example, an injection of water in the primary system, or a variation in the operating temperature of the primary system.

Another function of pressurizer 8 is to increase or decrease the operating pressure of the primary system.

To increase the operating pressure of the primary system, the heaters 28 are powered electrically, such that they heat the water contained in the lower part of the pressurizer and bring it to its boiling temperature. Part of this water evaporates, such that the pressure in the pressurizer 8 crown increases. Because the vapor is constantly in hydrostatic balance with the water circulating in primary system 1, the operational pressure of this primary system 1 increases.

To cause the operating pressure of primary system 1 to decrease, spray head 21 disposed in the pressurizer 8 crown is operated by allowing water circulation in pipe 22 by using means provided for this purpose. Water removed in primary pipe 10 at the pump 6 discharge is projected into the pressurizer 8 crown and causes the condensation of part of the water vapor found there. The water vapor pressure in the pressurizer 8 crown drops, such that the operating pressure of the primary system 1 also drops.

Thus, pressurizer 8 allows the water pressure of the primary system to be maintained at 155 bar to prevent the water that is heated to more than 300° C. from boiling.

Figure 2:
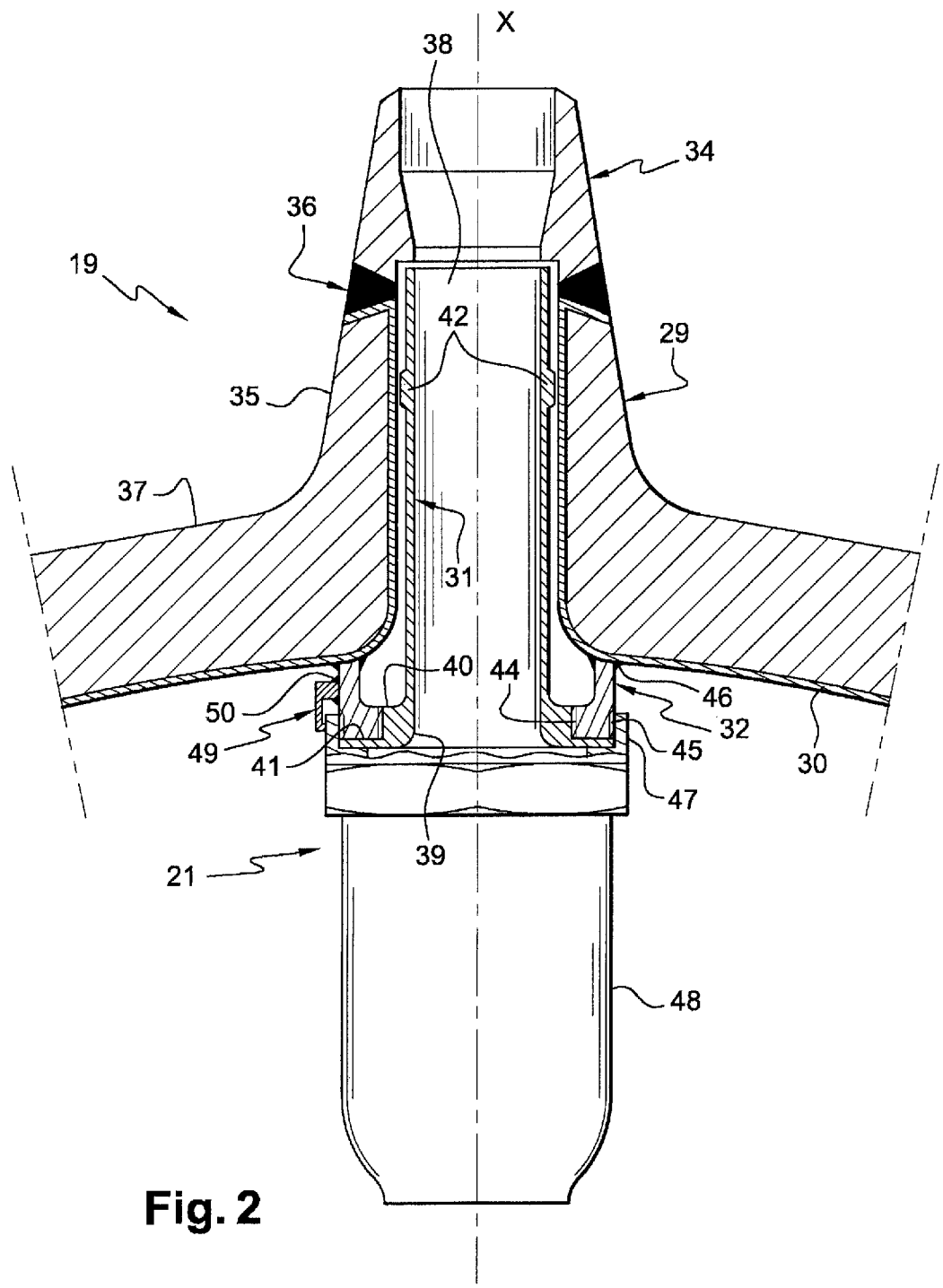
FIG. 2 is a partial cross sectional view, enlarged, of the spray system 19 such as represented in FIG. 1 showing the protective sleeve disposed inside the nozzle.

FIG. 2 is a partial cross sectional enlarged view of spray system 19 such as represented in FIG. 1.

The spray system 19 comprises:
  a spray nozzle 29 in SA 508 Gr3 type ferritic steel covered on its inner face with a coating 30 in stainless steel,
  a protective sleeve 31,
  a support piece 32,
  a spray head 21,
  an end piece 34 in 316 LN type austenitic stainless steel.

The end piece 34 presents a general truncated cone shape and vertical X axis.

The upper end of the end piece 34 is connected to pipe 22 such as represented in FIG. 1 through a homogeneous weld.

The spray nozzle 29 comprises:
  a first part 35 with a general truncated cone shape and vertical X axis presenting an upper end welded to the lower end of the end piece 34 through a weld 36 constituting a bimetallic weld,
  a second part 37 of hemispherical shape presenting a lower end welded on the hemispherical cap 13 (not represented in FIG. 2).

It will be noted that nozzle 29 described here corresponds to a nozzle added to hemispherical cap 13. Of course, the invention is also applicable to the case of a nozzle integrated to the cap.

The nozzle 29 thus delimits an internal channel 38 putting the inner space of casing 12 of the pressurizer in communication with pipe 22 such as represented in FIG. 1 via end piece 34.

The thermal protective sleeve 31 particularly protects weld 36. In fact, this zone may be subjected to thermal shocks due to the fact that relatively cold (temperature that may be on the order of 15° C.) spray water may be injected into the pressurizer that contains a hot fluid having a temperature that may be on the order of 345° C.

Sleeve 31 presents a general cylindrical shape at the central axis X and is disposed in the inner channel 38. The sleeve comprises:
  an upper free end covering weld 36,
  a lower end equipped with a shoulder 39 on its inner face extended by a cylindrical part 40 threaded on its outer surface.

The cylindrical part 40 is itself extended by a flange 41.

In order to prevent lateral vibrations induced by the passage of fluid, four antivibration pads 42 are regularly distributed on the periphery of the outer surface of the sleeve 31.

The support piece 32 is of a general cylindrical shape presenting a shoulder boring with, on its lower end, an internal thread 44 and an external thread 45. The support piece 32 is welded to the inner coating 30 of the pressurizer at the level of the spray nozzle 29 through a weld 46.

The spray head 21 comprises, on its upper part, a nut 47 and on its lower part, water spraying means 48 in the pressurizer crown, not detailed here.

The cylindrical part 40 of the thermal sleeve 31 is screwed on the internal thread 44 of the support piece 32.

The nut 47 of the spray head 21 is screwed on the external thread 45 of support piece 32.

The spray head 21 is prevented from being unscrewed and possibly falling thanks to the use of a hook-shaped piece 49 allowing the nut 47 to be locked in rotation, said piece 49 being welded via a weld 50 to support piece 32.

In the final position, flange 41 of sleeve 31 is wedged between spray head 21 and support piece 32.

If needed, removal of the thermal protective sleeve 31 is simplified by removing the sleeve from inside the pressurizer.

The method allowing sleeve 31 to be removed from inside the pressurizer is as follows:

- the weld 50 between the rotational locking piece 49 and the support piece 32 is removed,
- the rotational locking piece 49 is removed,
- the spray head 21 is unscrewed,
- the sleeve 31 is unscrewed.

Access to the bimetal weld 36 or to the coating 30 allowing the latter to be controlled or maintained is greatly simplified by removing sleeve 31.

Of course, the invention is not limited to the embodiment that has just been described.

In particular, other means of fixing the sleeve to the support piece may be contemplated. The flange of the sleeve may, for example, be equipped with openings coinciding with the threaded bore in the support piece. Screws traversing the openings and screwed in the holes may ensure fixation.

The invention claimed is:

1. A pressurizer for a pressurized water nuclear power plant, comprising:
    an upper cap equipped with a nozzle, the nozzle being covered, on an inner face of the nozzle, with a coating;
    an end piece connected to the nozzle through a first weld;
    a thermal protective sleeve;
    a support piece; and
    a fixing arrangement configured to fix the thermal protective sleeve to the support piece, the fixing arrangement being used to remove the thermal protective sleeve without cutting the first weld such that the first weld is maintained for inspection, the thermal protective sleeve being removed without cutting the end piece,
    wherein the support piece is fixed on the coating, the fixing arrangement including an external thread on the thermal protective sleeve and an internal thread on the support piece, the external thread being screwed on the internal thread, and
    wherein the thermal protective sleeve protects the first weld disposed inside the nozzle and is mounted in such a manner that the sleeve can be removed from inside the pressurizer using the fixing arrangement.

2. The pressurizer according to claim 1, wherein the sleeve includes, on an external surface of the sleeve, a plurality of antivibration pads, the pads being regularly distributed.

3. The pressurizer according to claim 1, wherein the support piece presents a further external thread, and wherein the pressurizer further comprising: a spray head screwed on the further external thread.

4. The pressurizer according to claim 3, wherein a lower end of the sleeve is such that, when the sleeve is in place, the lower end is positioned between the support piece and the spray head.

5. The pressurizer according to claim 3, further comprising: an arrangement locking in rotation the spray head.

6. The pressurizer according to claim 5, wherein the arrangement is fixed to the support piece through a second weld.

7. A method for removing a thermal protective sleeve of a pressurizer, comprising:
    removing a second weld between an arrangement of the pressurizer and a support piece of the pressurizer, the pressurizer further including an upper cap equipped with a nozzle, an end piece connected to the nozzle through a first weld, the thermal protective sleeve protecting the first weld disposed inside the nozzle, and a fixing arrangement configured to fix the thermal protective sleeve to the support piece, the fixing arrangement being used to remove the thermal protective sleeve without cutting the first weld such that the first weld is maintained for inspection, the thermal protective sleeve being removed without cutting the end piece, wherein the thermal protective sleeve is removed from inside the pressurizer using the fixing arrangement, the nozzle being covered, on an inner face of the nozzle, with a coating, the support piece being fixed on the coating, the fixing arrangement including an external thread on the thermal protective sleeve and an internal thread on the support piece, the external thread being screwed on the internal thread, the support piece presenting a further external thread, the pressurizer further including a spray head screwed on the further external thread, a lower end of the protective sleeve is such that, when the protective sleeve is in place, the lower end is positioned between the support piece and the spray head, the arrangement locking in rotation the spray head and being fixed to the support piece through the second weld;
    removing the arrangement;
    unscrewing the spray head; and
    unscrewing the thermal sleeve.

* * * * *